(12) United States Patent
Sanderson

(10) Patent No.: US 6,241,185 B1
(45) Date of Patent: Jun. 5, 2001

(54) PLANK-BASED EXTERNAL AIRCRAFT ARMAMENT/CARGO CARRYING APPARATUS WITH PIVOTABLE OUTER END PORTIONS FOLDABLE INTO THE AIRCRAFT CABIN AREA

(76) Inventor: Paul H. Sanderson, 2019 Cripple Creek, Lewisville, TX (US) 75077

( * ) Notice: Subject to any disclaimer, the term of this patent is extended or adjusted under 35 U.S.C. 154(b) by 0 days.

(21) Appl. No.: 09/250,787

(22) Filed: Feb. 16, 1999

(51) Int. Cl.$^7$ ............................... B64D 9/00; B64D 7/02
(52) U.S. Cl. ........................................ 244/118.1; 89/37.22
(58) Field of Search ............................ 244/118.1, 129.1, 244/129.5, 137.4; 89/37.22

(56) References Cited

U.S. PATENT DOCUMENTS

| | | | |
|---|---|---|---|
| 4,609,168 | * 9/1986 | Dean et al. | 244/118.1 X |
| 5,024,138 | 6/1991 | Sanderson et al. | 89/37.22 |
| 5,072,895 | * 12/1991 | Camus | 244/137.4 X |
| 5,421,239 | 6/1995 | Sanderson | 89/37.22 |
| 5,517,895 | 5/1996 | Sanderson | 89/37.16 |

* cited by examiner

Primary Examiner—Robert P. Swiatek
(74) Attorney, Agent, or Firm—Konneker & Smith, P.C.

(57) ABSTRACT

Armament/cargo support apparatus for an aircraft includes a central support plank member transversely secured to a bottom side of a helicopter cabin area at door openings formed in forwardly and outwardly sloping opposite horizontal outer wall portions of the helicopter. The outer ends of the central plank member are inwardly offset from the opposite outer helicopter wall portions and have outer end surfaces which are parallel to such outer wall portions. Auxiliary plank sections are pivotally secured to the outer ends of the central plank section and are pivotable about axes parallel to the sloping helicopter outer side wall portions, between first positions in which they are folded onto top sides of the central plank section within the cabin area, and second positions in which the auxiliary plank sections extend outwardly beyond opposite sides of the helicopter. Front and rear support panel structures are secured to front and rear side edge portions of the auxiliary plank sections for pivotal movement relative thereto between cargo carrying positions in which they extend transversely to the central support plank sections, and folded orientations in which the front and rear support panel structures on each auxiliary plank section may be pivoted toward one another to be folded into the cabin area with their associated auxiliary plank section. Each end of the central plank section is supportingly securable to an external fuel tank.

30 Claims, 7 Drawing Sheets

PLANK-BASED EXTERNAL AIRCRAFT ARMAMENT/CARGO CARRYING APPARATUS WITH PIVOTABLE OUTER END PORTIONS FOLDABLE INTO THE AIRCRAFT CABIN AREA

CROSS-REFERENCE TO RELATED APPLICATIONS

This application discloses subject matter similar to that disclosed in U.S. Pat. Nos. 5,024,138 and 5,421,239 which are hereby incorporated by reference herein in their entireties.

BACKGROUND OF THE INVENTION

The present invention generally relates to aircraft armament apparatus and, in a preferred embodiment thereof, more particularly relates to a support plank-based aircraft armament mounting system incorporating thereon apparatus for supporting various aircraft cargo externally of the aircraft.

The external mounting on aircraft of weaponry such as machine guns, rocket launchers and the like, particularly in retrofit applications, has heretofore carried with it a variety of structural, operational and safety limitations and disadvantages. As but one example, the external mounting of machine guns on a helicopter has previously entailed securing an outwardly projecting metal support tube to the helicopter and then mounting the gun on the tube. While this seems to be a fairly straightforward approach, unavoidable limberness in the support tube often led to firing inaccuracies in the mounted gun due to wobbling of its firing axis relative to the aircraft.

To a great extent these problems have been eliminated by using the honeycombed metal support plank structure illustrated and described in U.S. Pat. No. 5,024,138 to Sanderson et al. This support plank structure includes a fixed length central longitudinal section which is transversely insertable through the cabin portion of the aircraft in a manner such that fixed opposite end portions of this plank section project outwardly from opposite sides of the body of the aircraft through cabin door openings therein. Pivotally secured to the outwardly projecting ends of this central plank section are outer tip portions of the overall plank structure. These outer tip portions are vertically pivotable, about plank structure hinge lines disposed exteriorly of the aircraft, between (1) lowered, fully extended operating positions in which they form outward extensions of the fixed, outwardly projecting opposite ends of the central plank section, and (2) upwardly and inwardly folded transport and storage positions in which the outer tip portions rest atop the outer end portions of the central plank section outboard of the opposite sides of the aircraft.

At the outer ends of these foldable tip portions are downwardly projecting outboard weaponry mounting structures which, using conventional bomb lug connector apparatus, are operative to removably support a pair of multiple tube rocket launchers at their bottom ends. Mounted on the undersides of the fixed position outwardly projecting central plank section end portions, inwardly of the hinge lines for the foldable plank tip portions, are a pair of inboard support structures operative to removably support a pair of machine guns such as 7.62 mm "mini guns".

While the support plank-based aircraft armament system illustrated and described in U.S. Pat. No. 5,024,138 has proven to be structurally superior to metal tube-type weaponry support systems, the inboard portion of the central plank section, together with the ammunition magazines mounted on the top side thereof, occupies a considerable amount of space in the aircraft cabin area through which the plank extends. This, in turn, substantially reduces the amount of cargo that may be carried within the cabin area. To offset this reduction in the cargo-capacity of the aircraft cabin area, a modification was made to this support plank structure as illustrated and described in U.S. Pat. No. 5,421,239 to Sanderson.

In this modified support plank structure, front and rear sides of the outer end portions of the central plank section, which project outwardly beyond the opposite outer sides of the aircraft body, are fitted with removable front and rear auxiliary plank sections which may be pivoted, about horizontal axes parallel to the length of the plank structure, between (1) cargo support positions in which the two auxiliary plank sections on each outer central plank section end transversely extend horizontally from front and rear sides of the outwardly projecting central plank section end, and (2) a pivoted orientation in which one of the auxiliary plank sections is swung up onto the top side of its associated central plank section outer end portion.

While this modified plank structure advantageously provides, externally to its associated aircraft, additional cargo-carrying capacity its portions disposed externally to the aircraft also create an undesirable aerodynamic drag when not being used in a cargo-carrying capacity. It would thus be desirable to reduce such drag during flights of the aircraft in which the external cargo-carrying capabilities of the plank structure is not being utilized. It is to this goal that the present invention is directed.

SUMMARY OF THE INVENTION

In carrying out principles of the present invention, in accordance with a preferred embodiment thereof, improved support apparatus is provided for an aircraft, representatively a helicopter, and is useable to support, alone or in various combinations thereof, weaponry, cargo, and external fuel tanks. The aircraft has a cabin area with front and rear portions and opposite first and second outer side wall portions extending between the front and rear portions and having door openings therein. Illustratively, each of these opposite outer side wall portions of the aircraft representatively slopes forwardly and horizontally outwardly relative to the length of the aircraft.

In a preferred embodiment thereof, the support apparatus includes an elongated central support plank section having first and second opposite end portions with front and rear side edges. Securing apparatus is provided and is operative to horizontally secure the central support plank section to the aircraft, along a bottom side portion of the cabin area, in a manner such that the first and second opposite end portions of the central support plank section are respectively positioned inwardly adjacent the first and second outer side wall portions of the aircraft at the cabin area door openings therein.

The support apparatus also includes first and second auxiliary plank sections having inner ends and front and rear side edges. Cooperating mounting structures are associated with the first and second end portions of the central support plank section and the inner ends of the first and second auxiliary plank sections and are operative to respectively mount the first and second auxiliary plank sections on the first and second end portions of the central support plank section. The mounted first and second auxiliary plank sections are pivotal relative to the opposite central plank section ends, about generally horizontal first and second pivot axes extending through the cabin area of the aircraft and inset from the aforementioned first and second outer side wall portions thereof, between (1) first positions in which the first and second auxiliary plank sections are folded onto the end portions of the central support plank section and are disposed within the cabin area, and (2) second positions in which the first and second auxiliary plank sections are pivoted outwardly through the door openings and form longitudinal extensions of the central support plank section disposed exteriorly of the opposite sides of the aircraft.

According to one feature of the present invention, each of the generally horizontal first and second pivot axes on the central plank section ends are sloped relative to a horizontal reference axis transverse to the longitudinal axis of the central support plank section. Preferably, the first and second pivot axes, respectively, are oriented to be generally parallel to the forwardly and horizontally sloping first and second outer side wall portions of the aircraft when the central support plank section is operatively secured to the aircraft. Alternatively, if desired (for example when the first and second side wall portions of the aircraft are parallel to its longitudinal axis), the first and second pivot axes may be parallel to the longitudinal centerline of the aircraft.

In accordance with another aspect of the present invention, cooperating latch structures are associated with the first and second opposite end portions of the central support plank section and the first and second auxiliary plank sections and are operative, in response to movement of the first and second auxiliary plank sections from their first positions to their second positions, to releasably hold the first and second auxiliary plank sections in their second positions. Illustratively, the cooperating latch structures include blocking projections carried on the first and second end portions of the central support plank section, and spring-loaded detent members carried on the first and second auxiliary plank sections. The spring-loaded detent members are configured and positioned to be resiliently deflected and then releasably blocked by the blocking projections in response to movement of the first and second auxiliary plank sections from their first positions to their second positions.

Illustratively, the spring-loaded detent members are carried on the auxiliary plank sections for movement along axes which, with the auxiliary plank sections in their second positions, are downwardly and longitudinally inclined at a first angle relative to the longitudinal axis of the central plank section. This first angle is preferably about fifteen degrees. The blocking projections have bottom end surfaces, and the detent members have notched end portions with ledge surfaces that are parallel with and upwardly abut the bottom end surfaces of the blocking projections when the auxiliary plank sections are in their second positions.

Each ledge surface, when its associated auxiliary plank section is in its second position, is upwardly and longitudinally outwardly sloped at a second angle, preferably about two degrees, relative to the axis of its associated detent member. Coupled with the downward and longitudinally outward inclination of he detent member axes, this canting of the detent member end ledges provides additional blocking resistance against undesired upward unlatching movement of the auxiliary plank section.

Preferably, the support apparatus also includes a duality of front cargo support panel structures, a duality of rear cargo support panel structures, and mounting apparatus for mounting the front support panel structures on front side edges of the first and second auxiliary plank sections, and mounting the rear support panel structures on rear side edges of the first and second auxiliary plank sections. The mounted cargo support panel structures are pivotal relative to their associated auxiliary plank sections between (1) cargo carrying orientations in which the front and rear support panel structures respectively extend forwardly and rearwardly from their associated auxiliary plank section, and (2) folded orientations in which the front and rear support panel structures on each of the first and second auxiliary plank sections are pivoted toward one another for pivoting with their associated auxiliary plank section into the interior of the aircraft. Locking structures are provided for releasably locking the front and rear support panel structures in their cargo carrying orientations.

Illustratively, the mounting apparatus is operative to permit the front and rear support panel structures on each auxiliary plank to be selectively pivoted either upwardly or downwardly toward one another. Additionally, attachment structures are preferably carried on the first and second auxiliary plank sections for operatively securing weaponry thereto, the attachment structures representatively being machine gun mounting structures.

The sloping opposite ends of the central support plank section which are disposed within the interior of the aircraft cabin area facilitate the securement of the plank section ends to outer side portions of the cabin floor area, and also facilitate the securement to one of the central plank section ends of an external fuel tank positioned outwardly adjacent one of the sloping outer side wall portions of the aircraft at the cabin area thereof. A horizontally inner side of the exterior fuel tank is generally parallel to the adjacent sloped outer side portion of the aircraft, which increases the fuel capacity of the tank and provides it with an aerodynamically improved shape while at the same time simplifies the supporting connection of the tank to the adjacent central support plank end portion.

BRIEF DESCRIPTION OF THE DRAWINGS

FIG. 6A is an enlarged scale, simplified side elevational detail view of a portion of the latch structure.

DETAILED DESCRIPTION

Figure 1:
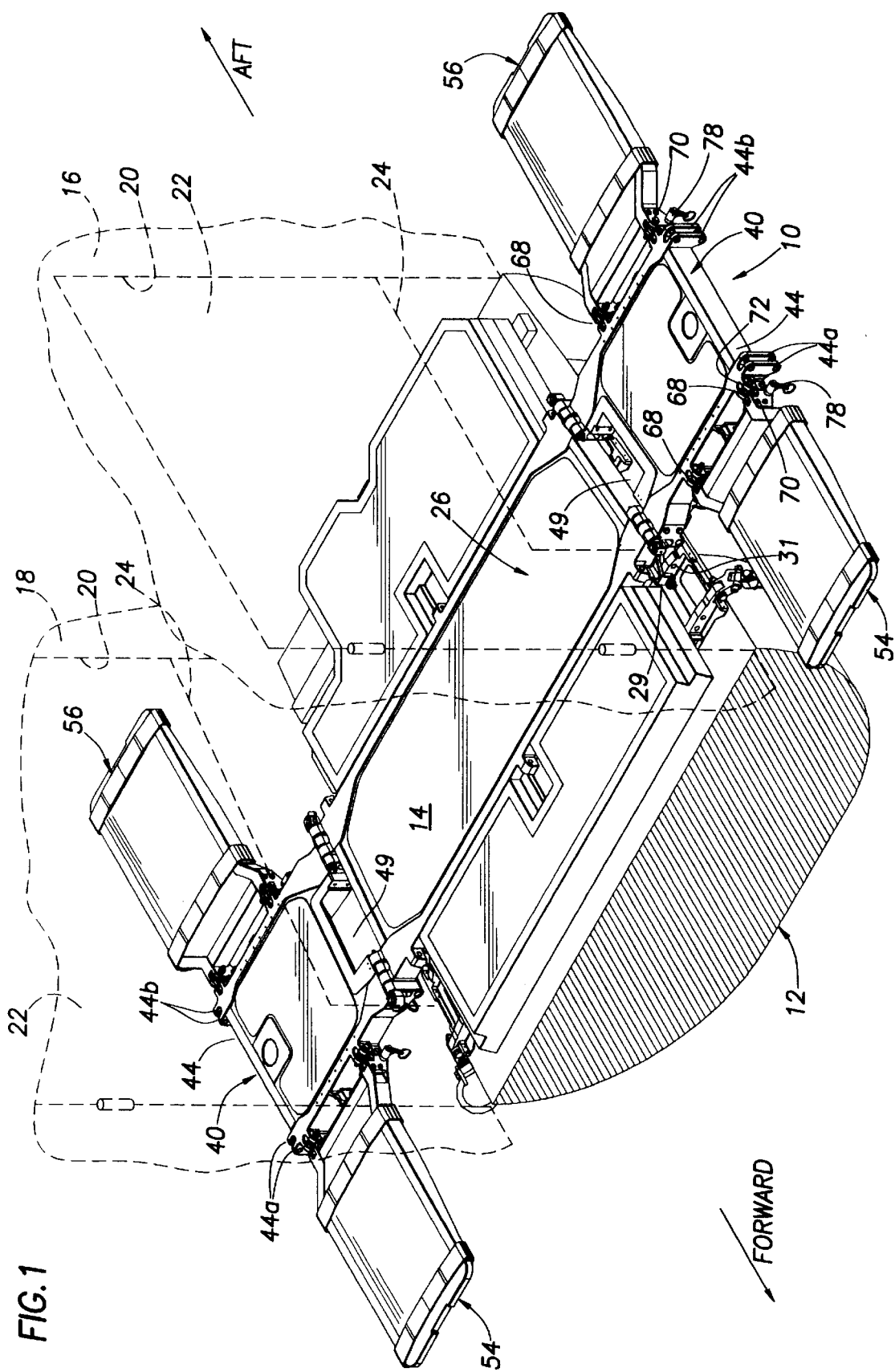
FIG. 1 is a phantomed perspective view of opposite side portions of an aircraft, representatively a helicopter, having a cabin area through which a support plank transversely extends, the support plank having on exteriorly disposed outer ends thereof specially designed cargo carrying structures which are foldable into the cabin area.

Referring initially to FIG. 1, the present invention provides improved support apparatus 10 which is operative to support armament, cargo, and a later described external fuel tank, and is connected to an aircraft, representatively a helicopter 12, having a cabin area 14 disposed between opposite left and right outer side wall portions 16,18 of the helicopter 12. The opposite outer side wall portions 16,18 have door openings 20 formed therein for pivotally receiving doors 22 with bottom side edge cutout areas 24 therein. As best illustrated in schematic form in FIG. 7, opposite outer side wall portions 16,18 are sloped forwardly and horizontally outwardly. While the support apparatus 10 will be representatively described herein as being incorporated in a helicopter, it will be readily appreciated that it also could be advantageously incorporated in other types of aircraft such as a fixed wing aircraft.

Support apparatus 10 includes an elongated metal central support plank section 26 which is longitudinally extended transversely through the cabin area 14, is anchored to the floor of the cabin area 14 by suitable securing apparatus 27 (see FIGS. 2–4), and is disposed entirely within the cabin area 14. Representatively, the securing apparatus 27 includes downwardly projecting lug pairs 29 disposed at corner areas of the plank section 26. Lug pairs 29 straddle and are suitably pinned to upwardly projecting floor mounting lugs 31 which are similar to the floor mounting lug structures 60,62 illustrated and described in U.S. Pat. No. 5,517,895 to Sanderson. With the unique exceptions noted below, support apparatus 10 is similar to the support plank-based apparatus 10 illustrated and described in U.S. Pat. No. 5,421,239 incorporated herein by reference.

Figure 2:
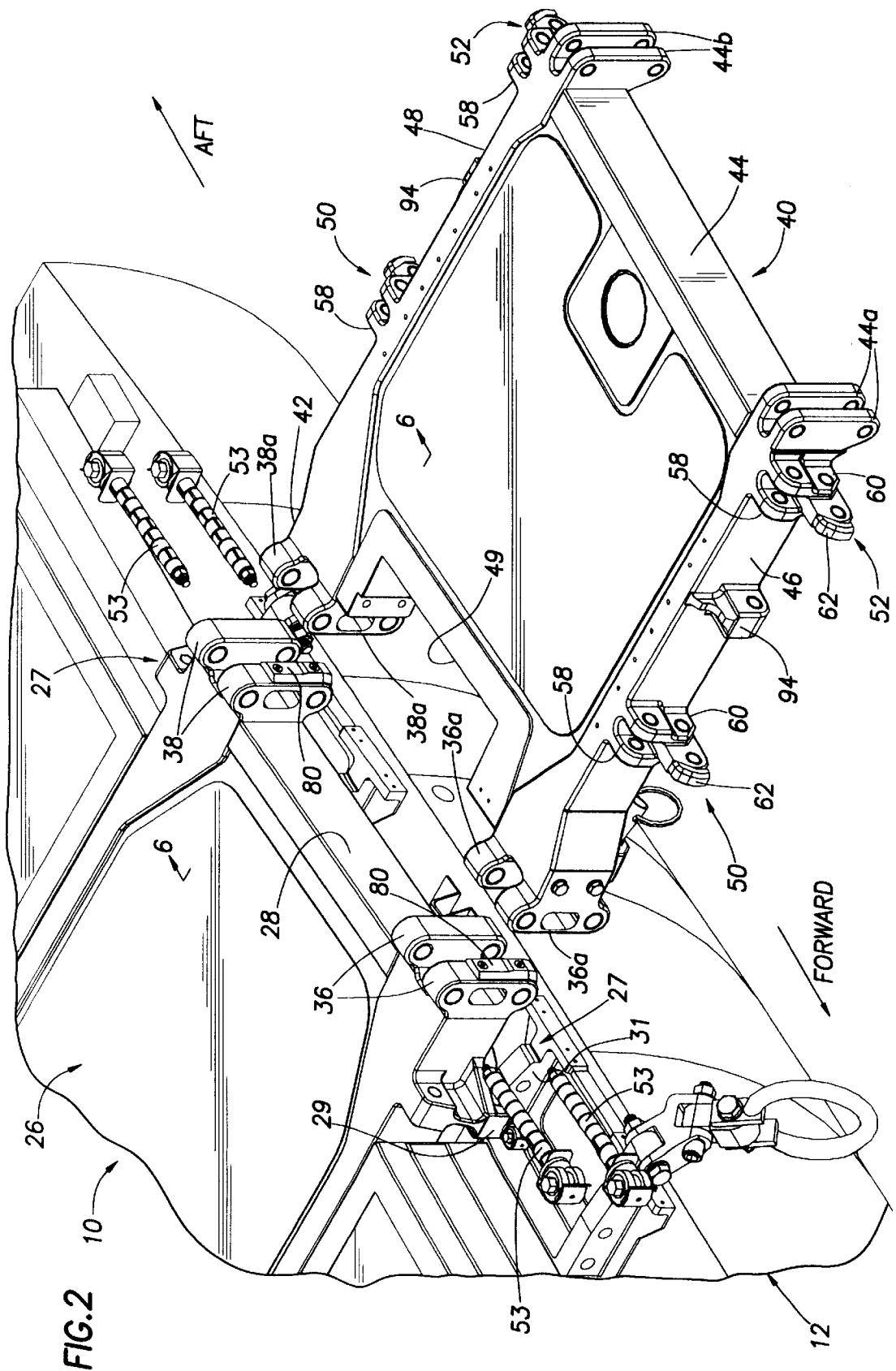
FIG. 2 is an enlarged scale perspective view of an auxiliary outboard plank section of the overall support plank structure removed from its associated center plank section within the cabin area.
Figure 7:
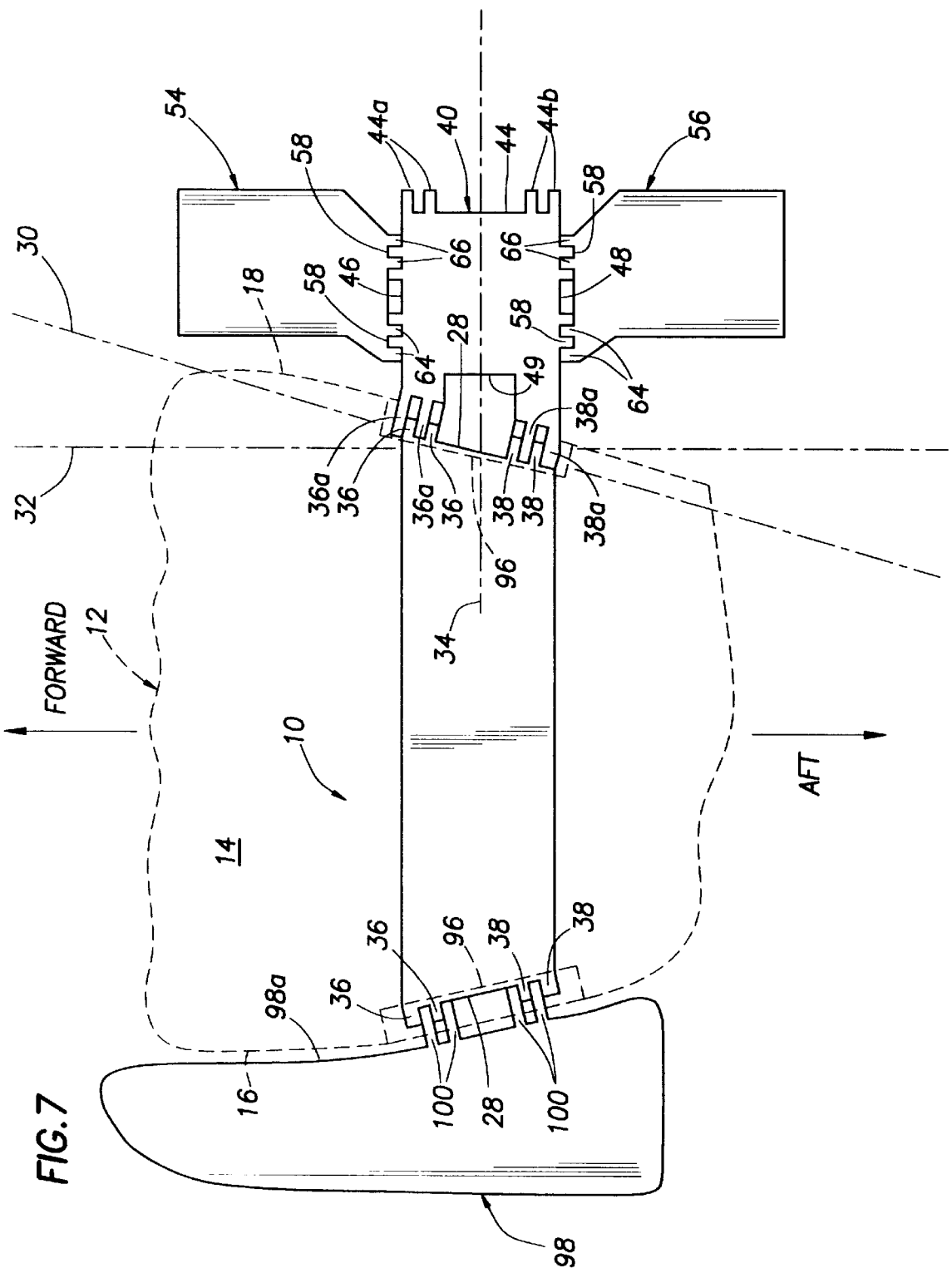
FIG. 7 is a simplified top plan view of the cabin area illustrating the operative attachment of an external fuel tank to an end of the center plank section disposed within the cabin area.

As best illustrated in FIGS. 2 and 7, according to a feature of the present invention the central support plank section 26 has opposite end surfaces 28 which are disposed within the cabin area 14. These end surfaces are preferably generally parallel to the helicopter outer side wall portions 16,18 which they are inwardly offset from. More specifically, each end surface 28 (for example, the right end surface 28 as viewed in FIG. 7) horizontally extends parallel to a subsequently described horizontal pivot axis 30 that is inwardly offset from and generally parallel to its adjacent helicopter outer side wall portion and is sloped relative to a horizontal reference axis 32 transverse to the longitudinal axis 34 of the central plank section 26. For mounting purposes later described herein, spaced apart front and rear lug pairs 36 and 38 project horizontally outwardly from each of the opposite end surfaces 28 of the central plank section 26.

Figure 3:
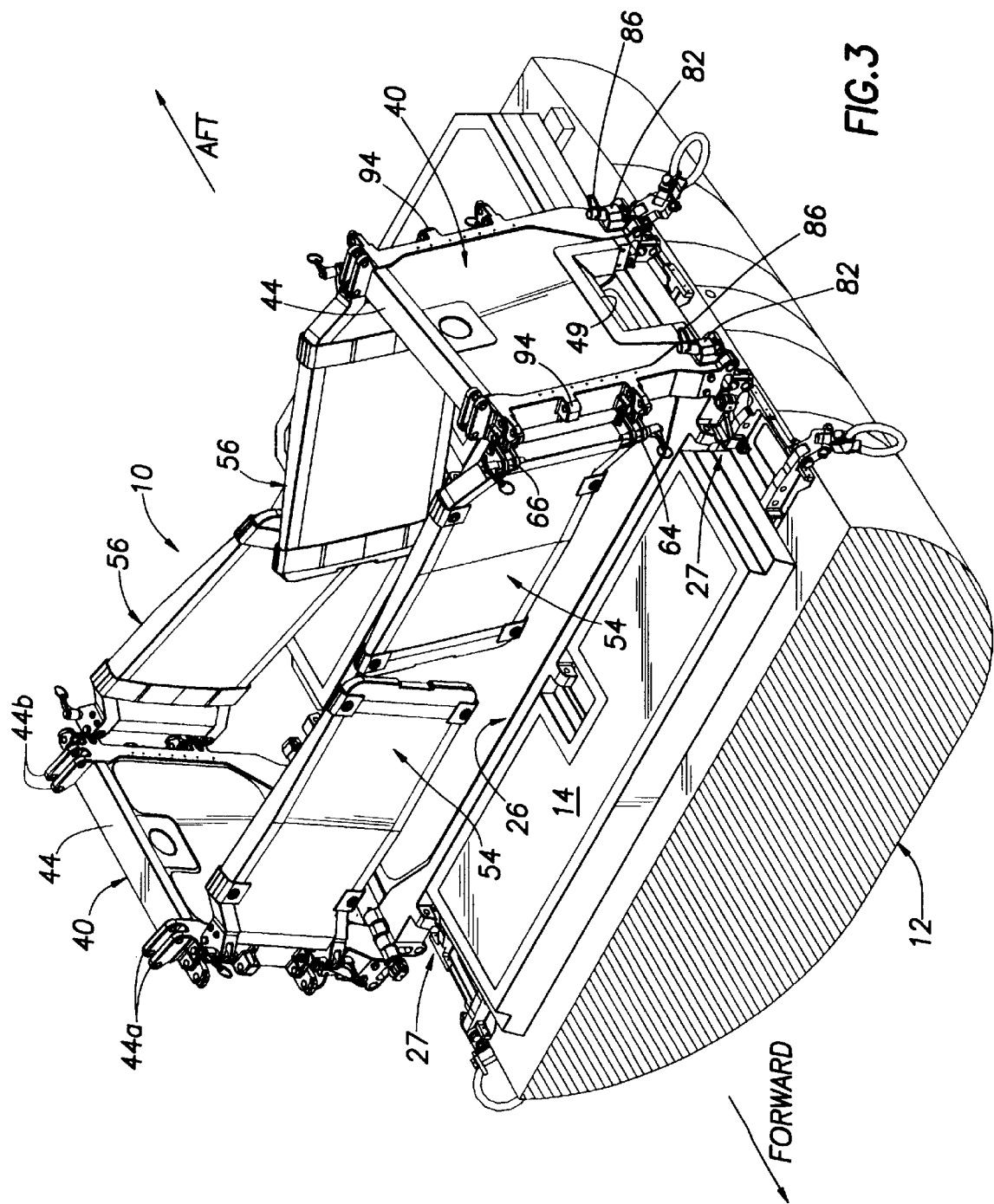
FIG. 3 is an enlarged scale perspective view of the outer ends of the support plank structure folded into the cabin area in a first available folded orientation.

With reference now to FIGS. 1–3, the support apparatus 10 also includes a pair of generally rectangular auxiliary metal outboard plank structures 40 which, in a manner subsequently described herein, may be pivotally secured to the opposite ends of the central plank section 26 and oriented to extend outwardly through the door openings 20 and form longitudinal outboard extensions of the central plank section 26. As best illustrated in FIG. 2, each of the auxiliary outboard plank structures 40 has an inner end 42, an outer end 44, a front side edge portion 46, and a rear side edge portion 48 slightly longer than the forward side edge portion 46.

A generally rectangular ammunition feed cutout area 49 is formed in the inner end 42 of each auxiliary plank structure 40 centrally between outwardly projecting front and rear mounting lug pairs 36a,38a. Projecting outwardly from the outer end 44 of each auxiliary plank structure 40 are mounting lug pairs 44a and 44b. These lug pairs are mateable with corresponding lug pairs on outer plank tip sections (not shown) to mount the tip sections, in a manner similar to that illustrated and described in U.S. Pat. No. 5,024,138 incorporated herein by reference, for the purpose of mounting rocket launchers, gun mounts, etc.

Each outboard auxiliary plank structure 40 is secured to an end of the central plank section 26, for vertical pivotal motion relative thereto about one of the sloped pivot axes 30, by interdigitating the lug pairs 36a,38a on the auxiliary plank structure 40 with the lug pairs 36,38 on the central plank section end (see FIG;. 2) and inserting suitable retaining pin members 53 through aligned holes 53a (see FIGS. 2 and 6) in the interdigitated lug pairs. This permits the auxiliary plank structures 40 to be vertically pivoted (about the sloped horizontal pivot axes 30 inwardly offset from the helicopter outer side wall portions 16,18) between (1) extended positions (see FIG. 1) in which they define longitudinal extensions of the central plank section 26 and project outwardly through the door openings 20, and (2) folded positions (see FIGS. 3 and 4) in which they are folded inwardly through the door openings 20 and overlie the top side of the central support plank section 26 so as to be disposed entirely within the cabin area 14.

Figure 5:
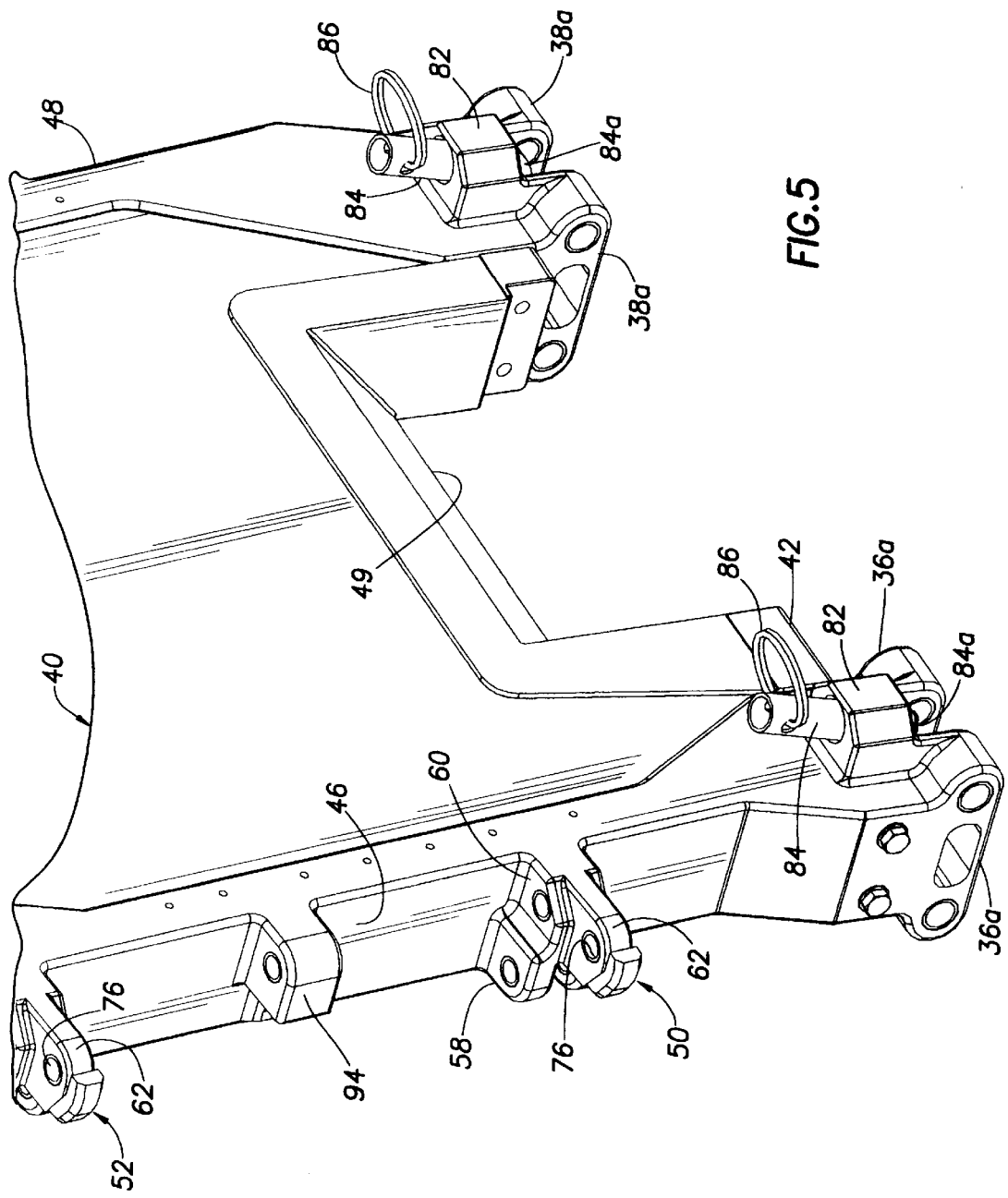
FIG. 5 is an enlarged scale bottom side perspective view of an inner end portion of an auxiliary outboard plank section of the overall support plank structure showing a pair of automatic latch structures thereon.

As best illustrated in FIGS. 2 and 5, spaced apart inboard and outboard mounting lug structures 50,52 are formed on the front and rear side edges of each auxiliary plank section 40. These lug structures 50,52 are similar to the lug structures 40,42 shown in U.S. Pat. No. 5,421,239 incorporated by reference herein, and are used to pivotally connect to the front and rear side edges of each of the auxiliary plank sections 40 front and rear metal cargo support panel structures 54,56 (see FIG. 1) which are substantially identical to the pivotable outboard plank sections 36,38 shown in U.S. Pat. No. 5,421,239.

Each of the lug structures 50,52 has an upper yoke portion 58, and a base portion 60 from which a tab section 62 outwardly projects. Pairs of mounting lugs 64,66 (see FIG. 7) are formed on the inner end corners of each of the front and rear cargo support panel structures 54,56 with each of the lug pairs 64,66 receiving and being pivotally secured to one end of a pivot member 68 by a hex bolt 70 (see FIG. 1). The opposite end of each pivot member 68 is received in one of the yoke portions 58 and pivotally secured therein by an expansion bolt 72.

Each of the mounting lug pairs 64,66 have an aligned pair of circular holes therein (not visible in the drawings). When the support panel structures 54,56 are pivoted to their FIG. 1 horizontal cargo carrying orientations the tab sections 62 are received between the lug pairs 64 and 66, and the holes in each of the lug pairs 64,66 are aligned with a circular hole 76 in their associated tab section 62 (see FIG. 5). The cargo support panel structures 54,56 may then be locked in place in their cargo carrying orientations using ball pins 78 inserted through the adjacent hole sets in the lug pairs 64,66 and the tabs 62 received therebetween. Further details and illustrations of this pivotal support panel mounting may be found in U.S. Pat. No. 5,421,239 incorporated by reference herein.

According to another aspect of the present invention, each of the auxiliary plank structures 40 is automatically and releasably locked in its FIG. 1 horizontally extended position, in response to downward pivoting to such position, by means of a specially designed locking structure which may be best seen in FIGS. 2 and 5–6A. This locking structure includes, for each auxiliary plank structure 40, (1) blocking projections in the form of strike members 80 disposed on the outer side edges of two of the central plank section outer end lugs 36 and 38 (see FIGS. 2 and 6); (2) hollow housing projections 82 formed on inner corner underside portions of the auxiliary plank structure 40 (see FIGS. 5 and 6); and (3) spring-loaded, elongated, generally cylindrical detent members 84 captively and slidably retained in the housing projections 82 for movement relative thereto along longitudinal axes 85 (see FIG. 6). With the auxiliary plank section 40 in its horizontally extended position, the detent member axis 85 is downwardly and longitudinally outwardly inclined relative to the longitudinal support plank axis 34 at an angle A of approximately fifteen degrees (see FIG. 6).

The detent members 84 have outer end portions that project outwardly through outer ends of the housing projections 82 and to which pull rings 86 are secured, and inner ends 84a (see FIGS. 5–6B) that project outwardly through inner ends of the housing projections 82. Detent members 84 are spring-biased along their axes 85 toward the inner end of their associated auxiliary plank structure 40. As the auxiliary plank structure 40 is downwardly pivoted about its upper retaining pin members 53 toward its extended horizontal orientation (as indicated by the arrow 88 in FIG. 6), the inner ends 84a of the detent members 84 slidably contact sloping outer side surface portions 80a of the strike members 80, on lower end portions thereof, thereby causing the detent members 84 to slightly retract into their housings 82 as indicated by the dashed arrow 90 in FIG. 6. When the auxiliary plank structure 40 reaches its horizontal extended position, the inner ends 84a of the detent members 84 snap back to their undeflected positions, as indicated by the dashed arrow 92 in FIG. 6.

This causes the detent member end portions 84a to underlie bottom end surfaces 80b of the strike members 80 and block upward pivoting of the auxiliary plank structure 40 from its extended horizontal position. To subsequently permit the auxiliary plank structure to be upwardly pivoted from its horizontal extended orientation, the detent rings 86 are simply pulled to move the detent member end portions 84a outwardly from their underlying relationships with the bottom end surfaces 80b of the strike members 80.

Figure 6:
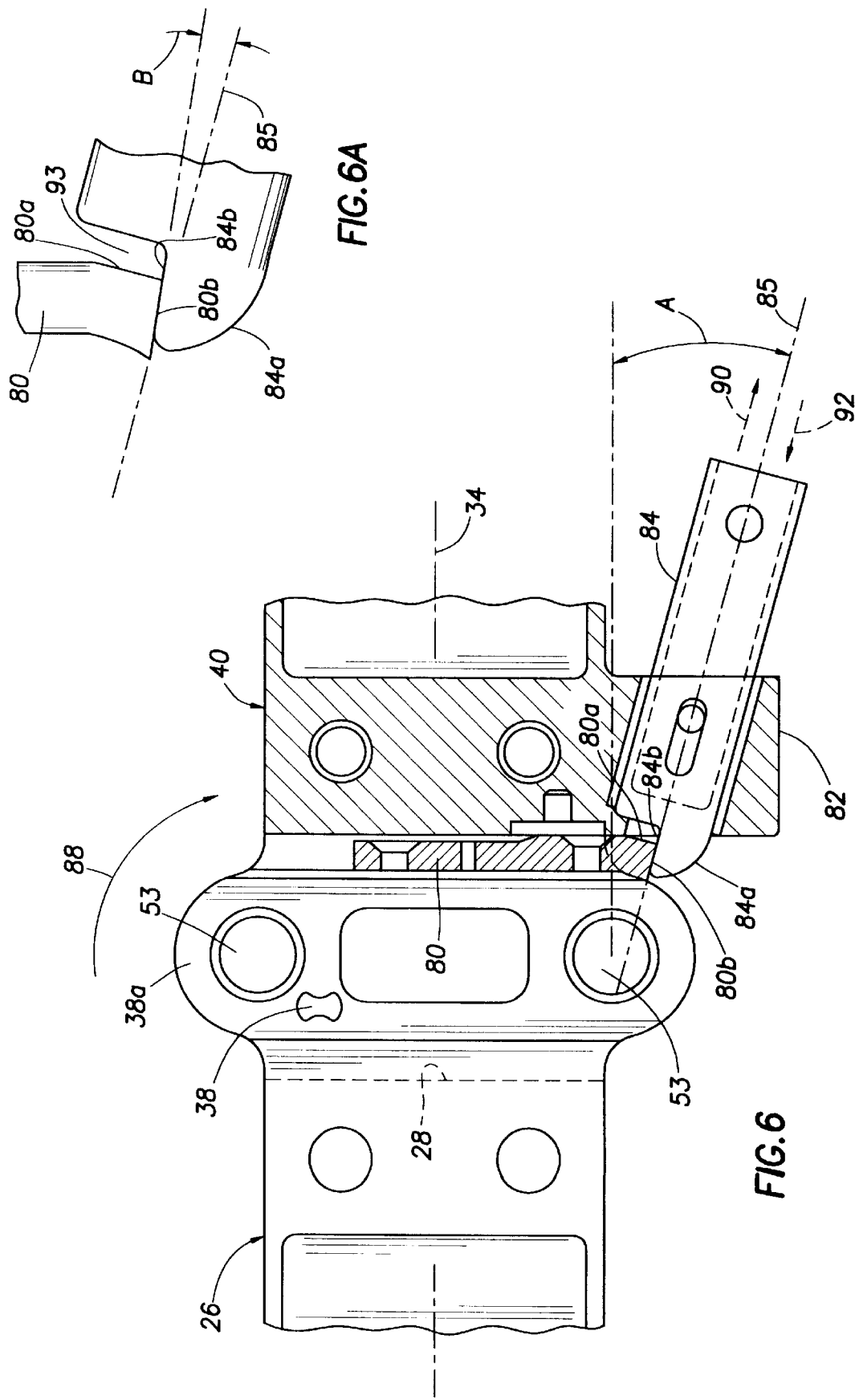
FIG. 6 is an enlarged scale partially sectioned side elevational view, taken generally along line 6—6 of FIG. 2, of an assembled lug interconnection area between the support plank and an auxiliary plank section and illustrates a specially designed automatic latch structure associated therewith.

As can best be seen in FIGS. 6 and 6A, an upper side portion of inner end section 84a of each detent member 84 is notched, as at 93, to form an upwardly facing ledge surface 84b on the end section 84a. With the auxiliary plank section 40 releasably latched into place in its horizontal extended position by the automatic latch structures, the ledge surfaces 84b are in parallel abutment with their associated bottom end surfaces 80b of the strike members 80. As best illustrated in FIG. 6B, each of the ledge surfaces 84b in this latched orientation is upwardly and longitudinally outwardly inclined relative to the longitudinal axis 85 of its associated detent member 84 at a small angle B of approximately two degrees. Coupled with the downward and longitudinally outward inclination of the detent member axes 85, this canting of the detent member end ledges 84b provides additional blocking resistance against undesired upwardly unlatching movement of the auxiliary plank sections 40. After the locking structures snap into place as described above, additional locking of the auxiliary plank sections 40 in their horizontal extended positions may be achieved simply by reinstalling their lower retaining pin members 53.

If desired, similar detent locking structures may be utilized in conjunction with the front and rear support panel structures 54 and 56. In this regard, as can best be seen in FIG. 2, the outer ends of the tab sections 62 are provided with configurations similar to those of the strike members 80 and can serve the same function if automatic detent-based locking structures are utilized in conjunction with the front and rear support panel structures 54 and 56.

Figure 4:
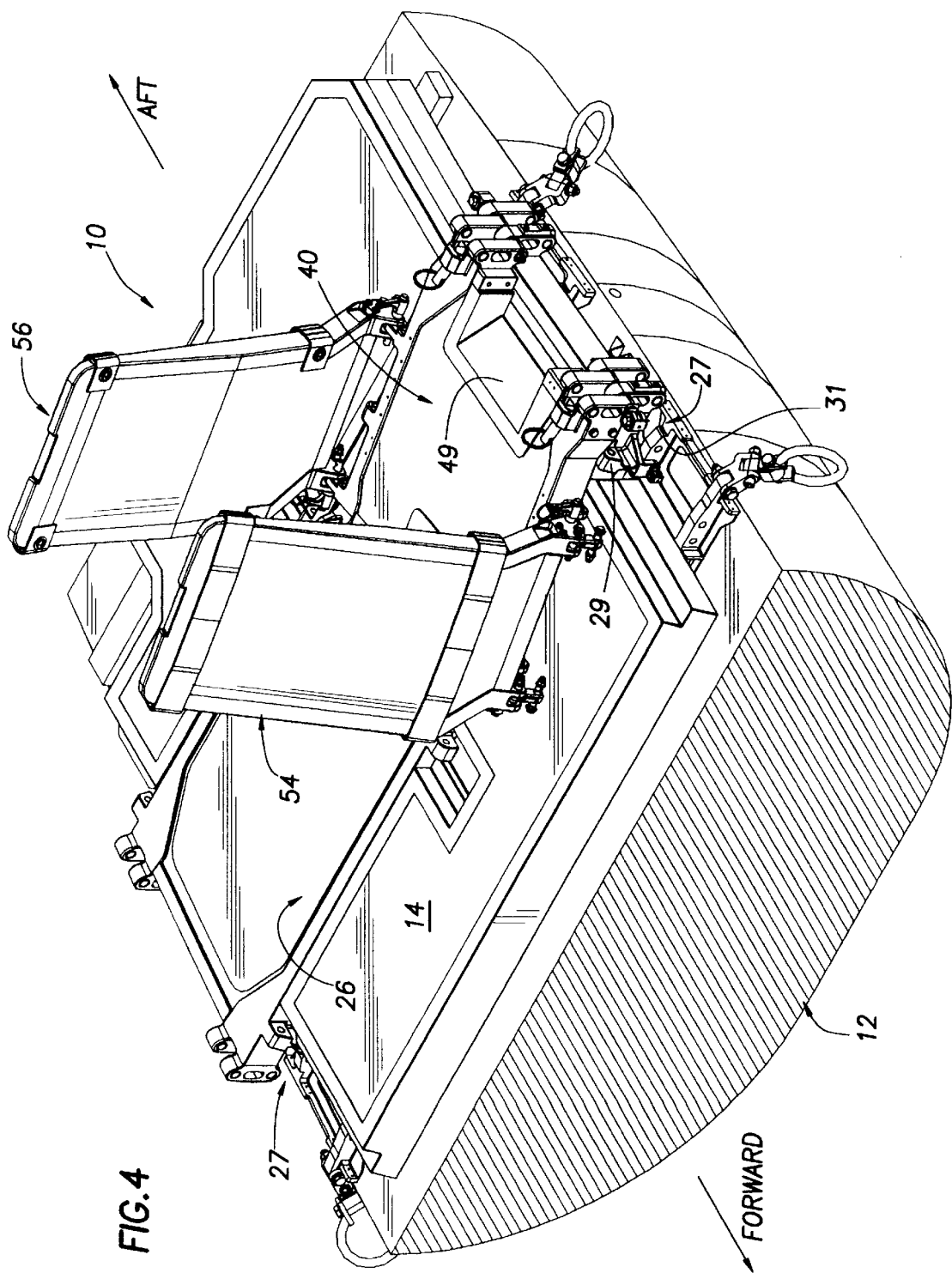
FIG. 4 is a smaller scale perspective view of one outer end of the support plank structure folded into the cabin area in a second available folded orientation.

Turning now to FIGS. 3 and 4, due to the unique construction of the support apparatus 10, either or both of the pivotally supported auxiliary plank structures, together with their pivotally carried cargo support panel structures 54 and 56, may be folded up into the cabin area 14 in a manner such that no portion of the overall support structure 10 projects outwardly from the helicopter 12. This advantageous positioning may be achieved in two manners.

First, by removing the ball lock pins 78, the cargo support panel structures 54,56 on each auxiliary plank structure 40 may be pivoted upwardly toward each other to overlie the auxiliary plank structure 40. The locking structure rings 86 are then pulled, to unlock the auxiliary plank structures 40 from their horizontal extended positions, and the auxiliary plank structures 40, together with their upwardly pivoted cargo support panel structures 54,56, are swung upwardly and inwardly through the door openings 20 into the cabin area 14 as illustrated in FIG. 3.

Alternatively, by removing the hex bolts 70 or the expansion bolts 72, the cargo support panel structures 54,56 on each auxiliary plank structure 40 may be pivoted downwardly toward each other to underlie the auxiliary plank structure 40. The locking structure rings 86 are then pulled, to unlock the auxiliary plank structures 40 from their horizontal extended positions, and the auxiliary plank structures 40, together with their downwardly pivoted cargo support panel structures 54,56 are swung upwardly and inwardly through the door openings 20 into the cabin area 14 as illustrated in FIG. 4 for one of the auxiliary plank structures 40 and its associated cargo support panel structures 54 and 56.

Referring again to FIG. 2, the base portions 60 of the auxiliary plank structure inboard and outboard lug portions 50 and 52, together with intermediate mounting lugs 94 formed on central front and rear side edge portions of the auxiliary plank structures 40 are configured, in a manner similar to that shown in the aforementioned U.S. Pat. No. 5,421,239, to be supportingly attached to complementary mounting structure on a machine gun (not shown) to mount the gun beneath the auxiliary plank structure 40. Such machine gun may, for example, be a 7.62 mm "mini gun", a 40 mm machine gun, or a .50 caliber machine gun. A machine gun mounted in this manner can be supplied with belted ammunition supplied from an ammo box (not shown) mounted on the central plank section 26 and fed downwardly through the plank cutout area 49 to the machine gun. Alternatively, other types of weaponry may be supported on the undersides of the auxiliary outboard plank structures 40, and outboard bomb rack assemblies can mount to lugs 44a,44b for mounting rocket launchers, gun mounts, etc.

With reference now to FIG. 7, the unique insetting of the plank pivot axes 30 from their adjacent forwardly and horizontally outwardly sloped helicopter outer side wall portions 16 and 18, and their generally parallel relationships with such outer side wall portions, provides the overall support apparatus 10 with several advantages relative to previously utilized plank-based weaponry and cargo support systems.

For example, as previously described herein, the insetting of the plank pivot axes from the outer side wall portions of the helicopter permits all exterior portions of the plank-based support to be swung into the cabin area when not being utilized, thereby substantially reducing in-flight equipment drag that the helicopter must overcome.

Additionally, in the helicopter 12 representatively illustrated herein, the area of the cabin floor to which the plank structure may be secured comprises two relatively narrow rectangular areas 96 (see FIG. 7) that longitudinally extend generally parallel to the helicopter outer side wall portions 16 and 18. Because the outer ends of the central plank section 26 are disposed within the cabin area 14, the sloped configuration of such outer plank section ends places their front and rear corners squarely over the areas 96 in a manner substantially facilitating the connection of the outer end corners of the central plank section 26 to the cabins floor structure.

Moreover, the orientation of the outer central plank section ends parallel to the forwardly and horizontally outwardly sloped helicopter outer side wall portions 16 and 18 facilitates the efficient support of an external fuel tank 98 outwardly adjacent one of the helicopter outer side wall portions, for example the left outer side wall portion 16 as schematically illustrated in FIG. 7. The representative fuel tank 98 has an inner side 98a which is sloped parallel to the helicopter left outer side wall portion 16, and has short connection lugs 100 which may be interdigitated with the facing central support plank section end lug pairs 36,38 and appropriately pinned in place. This permits the inner side 98a of the tank 98 to conform to the slope of the helicopter outer side wall portion 16 in an aerodynamically efficient orientation while at the same time being parallel to the facing outer end of the central support plank section 26 to thereby eliminate the necessity of forming relatively long connection arms or other structures on the tank to enable the tank to be connected to the facing central plank section end.

While it is preferable that the opposite ends of the central support plank section 26 be sloped as previously described herein, the outer ends of the plank section could alternatively be transverse to the longitudinal plank axis 34 (i.e., parallel to the longitudinal axis of the aircraft), if desired, without departing from principles of the present invention.

The foregoing detailed description is to be clearly understood as being given by way of illustration and example, the spirit and scope of the present invention being limited solely by the appended claims.

What is claimed is:

1. Support apparatus for an aircraft having a cabin area with front and rear portions and opposite first and second outer side wall portions extending between the front and rear portions and having door openings therein, said support apparatus comprising:
   an elongated central support plank section having first and second opposite end portions with front and rear side edges;
   securing apparatus operative to horizontally secure said central support plank section to the aircraft, along a bottom side portion of the cabin area, in a manner such that said first and second opposite end portions of said central support plank section are respectively positioned inwardly adjacent the first and second outer side wall portions at the door openings;
   first and second auxiliary plank sections having inner ends and front and rear side edges; and
   cooperating mounting structures associated with said first and second end portions of said central support plank section and said inner ends of said first and second auxiliary plank sections and operative to respectively mount said first and second auxiliary plank sections on said first and second end portions of said central support plank section for pivotal movement relative thereto, about generally horizontal first and second pivot axes extending through the cabin area of the aircraft, between (1) first positions in which said first and second auxiliary plank sections are inwardly folded to overlying relationships with said end portions of said central support plank section and are disposed within the cabin area, and (2) second positions in which said first and second auxiliary plank sections are pivoted outwardly through the door openings and form longitudinal extensions of said central support plank section disposed exteriorly of the opposite sides of the aircraft.

2. The support apparatus of claim 1 wherein:
   said central plank section has a longitudinal axis, and
   each of said generally horizontal first and second pivot axes is sloped relative to a horizontal reference axis transverse to said longitudinal axis of said central plank section.

3. The support apparatus of claim 2 wherein:
   each of the opposite first and second outer side wall portions of the aircraft horizontally slopes forwardly and outwardly, and
   said first and second pivot axes, respectively, are oriented to be generally parallel to the opposite first and second outer side wall portions of the aircraft when said central support plank section is operatively secured to the aircraft.

4. The support apparatus of claim 1 further comprising:
   cooperating latch structures associated with said first and second opposite end portions of said central support plank section and said first and second auxiliary plank sections and operative, in response to movement of said first and second auxiliary plank sections from said first positions to said second positions, to releasably hold said first and second auxiliary plank sections in said second positions.

5. The support apparatus of claim 4 wherein said cooperating latch structures include:
   blocking projections carried on said first and second end portions of said central support plank section, and
   spring-loaded detent members carried on said first and second auxiliary plank sections,
   the spring-loaded detent members being configured and positioned to be resiliently deflected and then releasably blocked by the blocking projections in response to movement of said first and second auxiliary plank sections from their first positions to their second positions.

6. The support apparatus of claim 5 wherein:
   said central plank section has a longitudinal axis,
   said spring-loaded detent members are carried on said first and second auxiliary plank sections for movement along axes which, with said auxiliary plank sections in said second positions, are downwardly and longitudinally outwardly inclined at a first angle relative to said longitudinal axis of said central plank section.

7. The support apparatus of claim 6 wherein said first angle is approximately fifteen degrees.

8. The support apparatus of claim 6 wherein:
   said blocking projections have bottom end surfaces, and
   said detent members have notched end portions with ledge surfaces that are parallel with and upwardly abut said bottom end surfaces of said blocking projections when said auxiliary plank sections are in said second positions.

9. The support apparatus of claim 8 wherein each ledge surface, when its associated auxiliary plank section is in its second position, is upwardly and longitudinally outwardly inclined at a second angle relative to the axis of its associated detent member.

10. The support apparatus of claim 9 wherein said second angle is approximately two degrees.

11. The support apparatus of claim 1 further comprising:

a duality of front support panel structures, a duality of rear support panel structures, and mounting apparatus for mounting said front support panel structures on said front side edges of said first and second auxiliary plank sections, and said rear support panel structures on said rear side edges of said first and second auxiliary plank sections, for pivotal movement relative to said first and second auxiliary plank sections between (1) cargo carrying orientations in which the front and rear support panel structures respectively extend forwardly and rearwardly from their associated auxiliary plank section, and (2) folded orientations in which the front and rear support panel structures on each of said first and second auxiliary plank sections are pivoted toward one another for pivoting with their associated auxiliary plank section into the interior of the aircraft, and locking structures operative to releasably lock said front and rear support panel structures in said cargo carrying orientations thereof.

12. The support apparatus of claim 11 wherein said mounting apparatus is operative to permit the front and rear support panel structures on each auxiliary plank structure to be selectively pivoted upwardly and downwardly toward one another.

13. The support apparatus of claim 1 further comprising:

attachment structures carried on said first and second auxiliary plank sections for operatively securing weaponry thereto.

14. The support apparatus of claim 13 wherein said attachment structures are machine gun mounting structures.

15. The support apparatus of claim 1 further comprising:

ammunition feed cutout areas formed in said inner ends of said first and second auxiliary plank sections.

16. Support apparatus for an aircraft having a cabin area with front and rear portions and an outer side wall portion extending between the front and rear portions and having a door opening therein, said support apparatus comprising:

an elongated central support plank section having an end portion with front and rear side edges;

securing apparatus operative to horizontally secure said central support plank section to the aircraft, along a bottom side portion of the cabin area, in a manner such that said end portion of said central support plank section is positioned inwardly adjacent the aircraft outer side wall portion at the door opening;

an auxiliary plank section having an inner end and front and rear side edges;

cooperating mounting structures associated with said end portion of said central support plank section and said inner end of said auxiliary plank section and operative to mount said auxiliary plank section on said end portion of said central support plank section for pivotal movement relative thereto, about a generally horizontal pivot axis extending through the cabin area of the aircraft, between (1) a first position in which said auxiliary plank section is inwardly folded to an overlying relationship with said end portion of said central support plank section and is disposed within the cabin area, and (2) a second position in which said auxiliary plank section is pivoted outwardly through the door opening and forms a longitudinal extension of said central support plank section disposed exteriorly of the aircraft outer side wall portion;

front and rear support panel structures;

mounting apparatus for respectively mounting said front and rear support panel structures on said front and rear side edges of said auxiliary plank section for pivotal movement relative thereto between (1) a cargo carrying orientation in which the front and rear support panel structures respectively extend forwardly and rearwardly from said auxiliary plank section, and (2) folded orientations in which said front and rear support panel structures are pivoted toward one another for pivoting with said auxiliary plan section into the interior of the aircraft; and locking structures operative to (1) releasably lock said auxiliary plank section in said second position thereof, and (2) releasably lock said front and rear support panel structures in said cargo carrying orientations thereof.

17. The support apparatus of claim 16 wherein:

said central plank section has a longitudinal axis, and said generally horizontal pivot axis is sloped relative to a horizontal reference axis transverse to said longitudinal axis of said central plank section.

18. The support apparatus of claim 17 wherein:

the outer side wall portion of the aircraft horizontally slopes forwardly and outwardly, and said pivot axis is oriented to be generally parallel to the outer side wall portion of the aircraft when said central support plank section is operatively secured to the aircraft.

19. The support apparatus of claim 16 further comprising:

attachment structures carried on said auxiliary plank section for operatively securing weaponry thereto.

20. The support apparatus of claim 19 wherein said attachment structures are machine gun mounting structures.

21. The support apparatus of claim 16 further comprising:

ammunition feed cutout areas formed in said inner end of said auxiliary plank section.

22. For use with an aircraft having a cabin area with front and rear portions and an outer side wall portion extending between the front and rear portions and having a door opening therein, fuel support apparatus comprising:

an elongated support plank structure having front and rear side edges, a longitudinal axis, and an end portion with an outer end surface;

securing apparatus operative to horizontally secure said support plank structure to a bottom side portion of the cabin area in a manner such that the length of said support plank structure extends through the cabin area transversely to the length of the aircraft, with said outer end surface of said support plank structure being inwardly offset from the side wall portion of the aircraft at the door opening; and mounting structure projecting outwardly from said outer end surface of said support plank structure and being positionable within the cabin area, said mounting structure being supportingly connectable to a side portion of a fuel storage tank disposed exteriorly of the cabin area at the door opening.

23. The fuel support apparatus of claim 22 wherein:

the outer side wall portion of the aircraft cabin area is forwardly and outwardly sloped, said outer end surface of said elongated support plank structure is sloped relative to a reference axis transverse to said longitudinal axis and extending through said front and rear side edges, and said securing apparatus is operative to position said outer end surface in a parallel relationship with the side wall portion of the aircraft at the door opening.

24. The fuel support apparatus of claim 22 wherein said mounting structure includes a plurality of lug projections disposed on said outer end surface of support plank structure.

25. For use with an aircraft having a cabin area with front and rear portions and an outer side wall portion extending between the front and rear portions and having a door opening therein, fuel support apparatus comprising:

an elongated support plank structure having front and rear side edges, a longitudinal axis, and an end portion with an outer end surface;

securing apparatus operative to horizontally secure said support plank structure to a bottom side portion of the cabin area in a manner such that the length of said support plank structure extends through the cabin area transversely to the length of the aircraft, with said outer end surface of said support plank structure being inwardly offset from the side wall portion of the aircraft at the door opening;

mounting structure associated with said end portion of said support plank structure and being positionable within the cabin area; and an exterior fuel storage tank having a side portion supportingly connectable to said mounting structure.

26. The fuel support apparatus of claim 25 wherein:

said side wall portion of said exterior fuel storage tank is positionable exteriorly adjacent the outer side wall portion of the aircraft in a generally parallel relationship therewith.

27. Support apparatus for an aircraft having a cabin area with front and rear portions and an outer side wall portion extending between the front and rear portions and having a door opening therein, said support apparatus comprising:

an elongated central support plank section having an end portion;

securing apparatus operative to horizontally secure said central support plank section to the aircraft, along a bottom side portion of the cabin area, in a manner such that said end portion of said central support plank section is positioned inwardly adjacent the outer side wall portion at the door opening;

an auxiliary plank section having an inner end; and cooperating mounting structures associated with said end portion of said central support plank section and said inner end of said auxiliary plank section and operative to mount said auxiliary plank section on said end portion of said central support plank section for pivotal movement relative thereto, about a generally horizontal pivot axis extending through the cabin area of the aircraft, between (1) a first position in which said auxiliary plank section is inwardly folded to an overlying relationship with said end portion of said central support plank section and is disposed within the cabin area, and (2) a second position in which said auxiliary plank section is pivoted outwardly through the door opening and forms a longitudinal extension of said central support plank section disposed exteriorly of the outer side wall portion of the aircraft.

28. The support apparatus of claim 27 wherein:

said central plank section has a longitudinal axis, and said generally horizontal pivot axis is sloped relative to a horizontal reference axis transverse to said longitudinal axis of said central plank section.

29. The support apparatus of claim 28 wherein:

the outer side wall portion of the aircraft is horizontally sloped forwardly and outwardly, and said pivot axis is oriented to be generally parallel to the outer side wall portion of the aircraft when said central support plank section is operatively secured to the aircraft.

30. The support apparatus of claim 27 further comprising:

cooperating latch structures associated with said end portion of said central support plank section and said auxiliary plank section and operative, in response to movement of said auxiliary plank section from said first position to said second position, to releasably hold said auxiliary plank section in said second position.

* * * * *